Patented Oct. 26, 1948

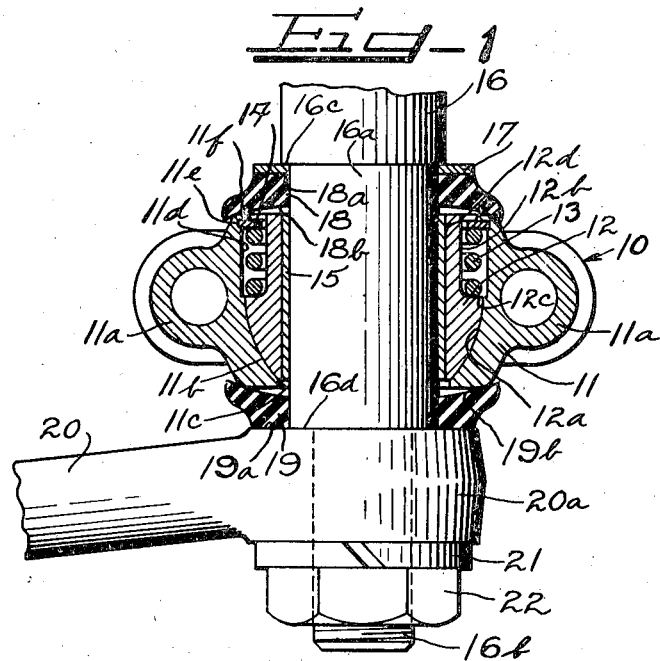
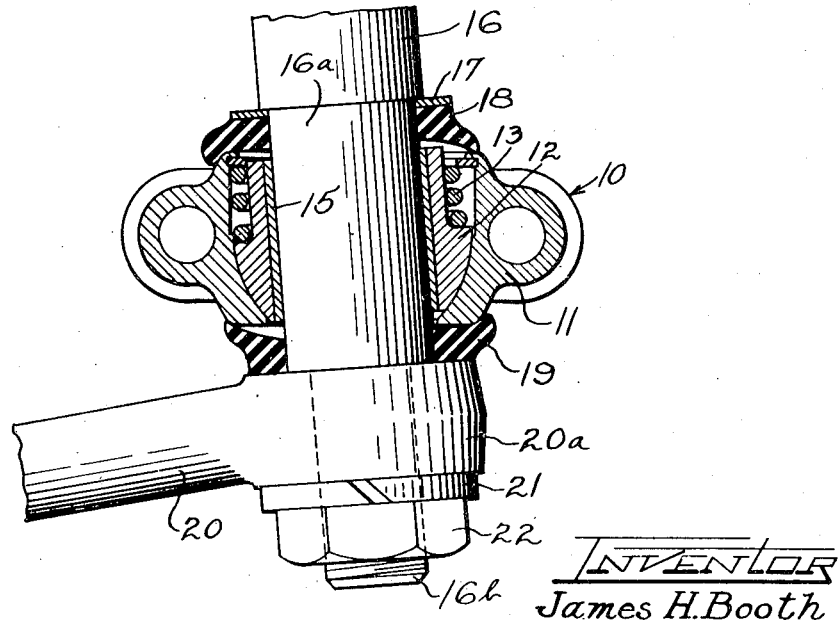

2,452,352

UNITED STATES PATENT OFFICE 2,452,352

SELF-ALIGNING BEARING

James H. Booth, Detroit, Mich., assignor to Thompson Products, Inc., Cleveland, Ohio, a corporation of Ohio Application October 25, 1944, Serial No. 560,243

6 Claims. (Cl. 308—72)

This invention relates to self-aligning bearings especially adapted for automobile steering shafts, line shafts, and the like.

Specifically, the invention relates to a self-aligning bearing unit wherein a housing tiltably supports a spring-pressed hollow member receiving a shaft therethrough and providing a bearing for rotatably supporting the shaft.

The invention will be hereinafter specifically described as embodied in a steering rod supporting bearing, but it should be understood that the self-aligning bearings of this invention are not limited for use in connection with steering rods, since they obviously will rotatably support any type of shaft member. For example, the devices of this invention are especially useful in rotatably supporting line shafts and other power-transmitting shafts.

A feature of this invention deals with the provision of a spring-pressed tiltable bearing unit that will automatically maintain a good tilting seat in a housing.

A further feature of this invention relates to the sealing of a tiltable bearing assembly.

An object of the invention is to provide a self-aligning bearing equipped with an automatic wear take-up tilting bearing unit.

A further object of the invention is to provide an inexpensive self-aligning bearing that will always maintain a good tilting seat in a housing.

A further object of the invention is to provide a self-aligning bearing unit adapted to be cocked against spring pressure without impairing the rotating efficiency of the unit.

A specific object of the invention deals with the provision of a self-aligning bearing that operates efficiently without the necessity for lapping or polishing the tilting bearing surfaces.

A still further specific object of the invention deals with the provision of a tiltable bearing unit having a liner sleeve pressed therein to form a bearing surface for a shaft or other device to be rotatably mounted by the unit.

Other and further objects of the invention will be apparent to those skilled in the art from the following detailed description of the annexed sheet of drawings which, by way of a preferred example only, illustrates one embodiment of the invention.

On the drawings:

Figure 1 is a fragmentary elevational view, with parts broken away and shown in vertical cross section, of a steering rod and pitman arm assembly rotatably mounted in a self-aligning bearing according to this invention.

Figure 2 is a view similar to Figure 1, but illustrating a cocked or tilted position for the assembly.

As shown on the drawings:

In Figures 1 and 2 the reference numeral 10 designates generally a self-aligning bearing unit according to this invention. The unit 10 includes a housing 11 which can be forged or cast. The housing 11 has laterally projecting ears 11a, 11a with apertures therethrough for receiving mounting studs (not shown) to secure the housing on the frame of an automotive vehicle. The housing 11 has a fragmental spherical ball seat 11b therein diverging from a reduced-diameter opening 11c in one end of the housing to a cylindrical bore 11d in the other end of the housing.

The seat 11b can be formed by a coining or machining operation and need only be relatively rough finished. The bore 11d is counterbored as at 11e at the top end of the housing.

A tilting bearing member 12 is mounted in the housing 11 and has a semi-spherical head portion 12a tiltably mounted on the bearing wall 11b of the housing. The head portion 12a has a cylindrical sleeve portion 12b projecting upwardly therefrom, and a flat shoulder 12c is formed between the divergent end of the head 12a and the base of the cylindrical portion 12b. A straight cylindrical bore 12d extends completely through the member 12.

A coil spring 13 is disposed in the housing 11 around the cylindrical portion 12b of the bearing member 12 and is bottomed on the shoulder 12c of this member.

A washer 14 is seated in the counterbore 11e of the housing and bottomed on the shoulder provided at the end of this counterbore. The washer 14 has an aperture therethrough of larger diameter than the diameter of the cylindrical portion 12b of the bearing member 12 but of smaller diameter than the diameter of the coil spring 13 so as to abut the coil spring and hold it in loaded compressed condition on the shoulder 12c. The washer 14 is held in fixed relation in the counterbore 11e by spinning a portion 11f of the housing over the marginal periphery of the washer.

A liner sleeve 15 is press-fitted in the bore 12d of the bearing member 12. This sleeve 15 can be composed of bronze, lubricant-impregnated metal, graphitic carbon, plastic, or the like. If desired, the entire bearing element 12 can be a one-piece member composed of a synthetic resin such as a phenolic condensation product or the like.

A steering shaft 16 has a reduced-diameter portion 16a extending through the bearing unit 10 in bearing relation with the sleeve 15. The reduced-diameter portion 16a projects beneath the bottom of the housing 11 and has a further reduced-diameter portion 16b depending beneath the housing.

A shoulder 16c is provided at the top of the reduced-diameter portion 16a while a second shoulder 16d is provided at the top of the reduced-diameter portion 16b.

A washer 17 is disposed around the shaft portion 16a against the shoulder 16c and a rubber dust cap 18 snugly embraces the shaft portion 16a and has a top face 18a seated against the washer 17 and a concave bottom face 18b having the peripheral portion thereof seated on the spun-over end 11f of the housing. The concave face 18b is normally spaced from the bearing member 12.

A second rubber dust cap or sealing ring 19 is disposed around the shaft portion 16a that projects beneath the housing 11.

A pitman arm 20 has an eye end 20a seated on the reduced-diameter portion 16b of the shaft against the shoulder 16d thereof. The sealing ring or dust cap 19 has a flat bottom face 19a seated on the top of the eye end 20a of the pitman arm. The sealing ring 19 has a concave top face 19b the outer peripheral portion of which is seated on the outer bottom end of the housing in spaced relation outwardly from the aperture 11c of the housing.

A lock washer 21 is disposed around the portion 16b of the shaft, and a nut 22 is threaded on this portion against the lock washer 21 to secure the eye end 20a of the pitman arm to the steering rod.

The steering rod 16 is thus rotatably mounted in the sleeve 15. The sleeve 15 is a radial bearing rotatably supporting the rod and, since it is disposed in the tiltable bearing member 12, the housing 11 can assume a tilted position as illustrated in Figure 2 without binding the bearing. Thus, for example, whenever the studs for mounting the housing 11 are somewhat out of line, this housing can be tilted relative to the bearing 12, or the shaft 16 can be tilted relative to the housing 11 without in any way interfering with the efficiency of the bearing sleeve 15.

The sealing caps 18 and 19 will readily accommodate the cocked or tilted relationship between the housing and shaft through interparticle flow of the rubber without breaking sealing contact with the housing and shaft as illustrated in Figure 2.

The spring 13 readily accommodates the cocked position for the bearing member 12 and, at the same time, continues to urge this bearing member toward the convergent end of its seat 11b to take up any wear developed during usage. The sleeve-like tail part of the ball member or bearing element 12 prevents the spring from contacting the shaft.

From the above descriptions it will be understood that the invention provides an inexpensive efficiently operating self-aligning radial bearing especially adapted for rotatably supporting a steering rod or other shaft.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A self-aligning bearing which comprises a housing having laterally projecting mounting ears, a ball seat in said housing, a ball member tiltably mounted on said seat, a shoulder on said ball member, a spring acting on said shoulder urging the ball member into seating relationship with its seat, a bearing sleeve pressed into said ball member and defining a radial bearing, a shaft rotatably mounted in said bearing, seal members disposed around said shaft on opposite sides of said housing having opposed concave end faces in sealing engagement with said housing, and means secured to said housing holding said spring in compressed condition on said shoulder of the ball member.

2. A self-aligning bearing comprising a housing having a bearing surface at one end thereof accommodating tilting movement and diverging from a reduced-diameter opening in one end of the housing to a cylindrical bore extending to the other end of the housing, a hollow bearing member in said housing having a head portion tiltably mounted on said bearing wall, a shoulder portion at the base of the head and an integral sleeve portion of less diameter than said bore, a coil spring disposed around said sleeve portion of the bearing member seated on said shoulder, a retainer secured in said housing holding said spring in loaded condition, a bearing liner sleeve pressed in said bearing member, and mounting means on said housing.

3. A steering shaft bearing comprising a housing having mounting ears for fixedly attaching the housing to an automotive frame or the like, said housing having a ball seat therein at one end thereof and a cylindrical bore in the other end thereof, a tiltable bearing member having a ball head portion seated on said seat and a cylindrical portion projecting from said head portion, a spring seated around said cylindrical portion, means loading said spring to urge the ball member against its seat, a steering shaft rotatably mounted in the ball member, rubber seal rings disposed around said steering shaft on opposite ends of said housing, and means holding said rubber seal rings against said housing.

4. A steering shaft assembly comprising a shaft having a reduced diameter cylindrical portion providing a shoulder on the shaft, a washer bottomed on said shoulder, a rubber sealing ring seated on said reduced diameter portion against said washer, said sealing ring having a concave end face, a housing member having an open end receiving the marginal portion of said sealing ring therearound in sealing relation therewith, ears on said housing for attaching the housing to an automobile frame or the like, a bearing member tiltably mounted in said housing having a plain cylindrical bearing sleeve therein rotatably supporting the reduced diameter portion of said shaft, a spring member in said housing urging the tiltable bearing member into constant bearing engagement with the housing, a second sealing ring disposed around the reduced diameter portion of the shaft and having a concave end face seated around said housing, and a pitman arm having an eye end bottoming said second sealing ring to hold said ring in sealing relation against said housing whereby said steering shaft can tilt relative to the housing without interfering with the rotatable support for the shaft.

5. A self-aligning bearing for a shaft, said bearing comprising a housing with a bore shaped to form a seat to accommodate tilting movements at one end and enlarging into a cylindrical bore at the other end, a tiltable bearing member having a head portion seated in said seat, a sleeve portion of less diameter than said bore, and a shoulder portion at the base of said head portion, a coil spring disposed around said sleeve portion of said bearing member and seated on said shoulder, and a retainer secured in said housing holding said spring in a loaded condition, said bearing member having a bore passing therethrough to receive said shaft.

6. A self-aligning bearing for a shaft having abutting sections of smaller and larger diameter, said bearing comprising a housing with a bore shaped to form a seat to accommodate tilting movements at one end and enlarging into a cylindrical bore at the other end, a tiltable bearing member with a bore to receive the section of said shaft having said smaller diameter and having a head portion seated in said seat, said member having a sleeve portion of less diameter than said bore and a shoulder portion at the base of said head portion, a coil spring disposed around said sleeve portion of said bearing member and seated on said shoulder, a retainer secured in said housing holding said spring in a loaded condition, and a resiliently deformable seal ring surrounding said shaft at said section of smaller diameter and disposed between said bearing member and said section of larger diameter to rest against the abutment formed by said sections to support said shaft.

JAMES H. BOOTH.

REFERENCES CITED

The following references are of record in the file of this patent:

UNITED STATES PATENTS

| Number | Name | Date |
| --- | --- | --- |
| 1,446,134 | Smith | Feb. 20, 1923 |
| 1,635,468 | Dodge | July 12, 1927 |
| 1,903,483 | Skillman | Apr. 11, 1933 |
| 1,946,086 | Lyman | Feb. 6, 1934 |
| 2,061,758 | Eastman | Nov. 24, 1936 |
| 2,126,408 | Peo | Aug. 9, 1938 |
| 2,309,281 | Steele | Jan. 26, 1943 |

FOREIGN PATENTS

| Number | Country | Date |
| --- | --- | --- |
| 192,288 | Great Britain | Feb. 1, 1923 |
| 231,715 | Great Britain | Apr. 9, 1925 |